United States Patent [19]

Jones et al.

[11] 4,114,804

[45] Sep. 19, 1978

[54] COUNTERFEIT DETECTION MEANS FOR PAPER COUNTING

[75] Inventors: Alan P. Jones, Levittown, Pa.; William Sherman, Willingboro, N.J.

[73] Assignee: Brandt-Pra, Inc., Cornwells Heights, Pa.

[21] Appl. No.: 711,436

[22] Filed: Aug. 4, 1976

[51] Int. Cl.[2] ...................... G06K 13/16; G06K 7/10; G06F 7/02; G07F 1/02

[52] U.S. Cl. .................................. 235/476; 235/468; 235/449; 235/419; 194/4 R

[58] Field of Search .................... 209/74 R; 271/62 B, 271/187; 340/149 A, 152 R, 149 R; 194/4 R, 4 A, 4 B, DIG. 9; 283/8 R, 8 A, 8 B; 235/61.11 E, 61.11 D, 61.11 R, 61.12 N, 61.11 K

[56] References Cited

U.S. PATENT DOCUMENTS

| | | | |
|---|---|---|---|
| 2,922,893 | 1/1960 | Ett | 235/61.11 K |
| 2,950,799 | 8/1960 | Timms | 235/61.11 K |
| 3,092,402 | 6/1963 | Reed | 235/61.12 N |
| 3,293,543 | 12/1966 | Nelson | 194/4 R |
| 3,480,785 | 11/1969 | Aufderheide | 194/4 R |
| 3,509,535 | 4/1970 | Berube | 194/4 R |
| 3,763,356 | 10/1973 | Berler | 235/61.11 E |
| 3,791,516 | 2/1974 | Tramposch | 209/74 R |
| 3,912,255 | 10/1975 | McInerny | 271/187 R |
| 3,980,990 | 9/1976 | Berube | 235/61.11 K |

*Primary Examiner*—Robert M. Kilgore

*Attorney, Agent, or Firm*—Louis Weinstein

[57] ABSTRACT

In an apparatus for accurately counting a stack of documents and especially legal tender (i.e., paper money), tests for authenticity are performed simultaneously with the counting operation and without in any way impeding the type of counting operation being performed. At the same time that the counting operation is being performed, at speeds of the order of 1250 bills per minute, each bill or note currency is tested for certain properties of genuineness, including fluorescence and magnetic characteristics. Notes which fail to satisfy the tests are categorized as suspect notes and automatically stop the machine and thereby temporarily halt the counting operation. The suspect note is isolated as the top-most document in the outfeed stacker greatly facilitating the handling and removal of the suspect bill for further examination. The presence of a suspect note further provides a visual and/or audible alarm indication thereof simultaneously with the halting of the counting operation thereby facilitating removal of the suspect note by conventional methods to permit further inspection. The circuitry provided enables counting to be immediately resumed by depressing a start button. The test may be performed when the equipment is being operated in either the batching or normal counting mode.

Detection means are provided for testing fluorescence and/or magnetic properties of the bills being counted.

23 Claims, 10 Drawing Figures

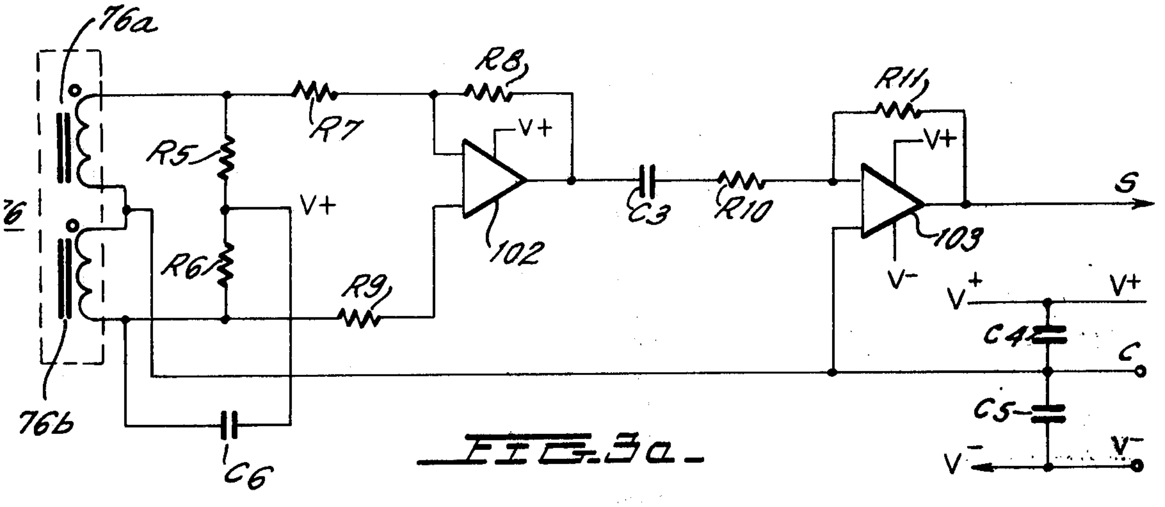
FIG. 3a
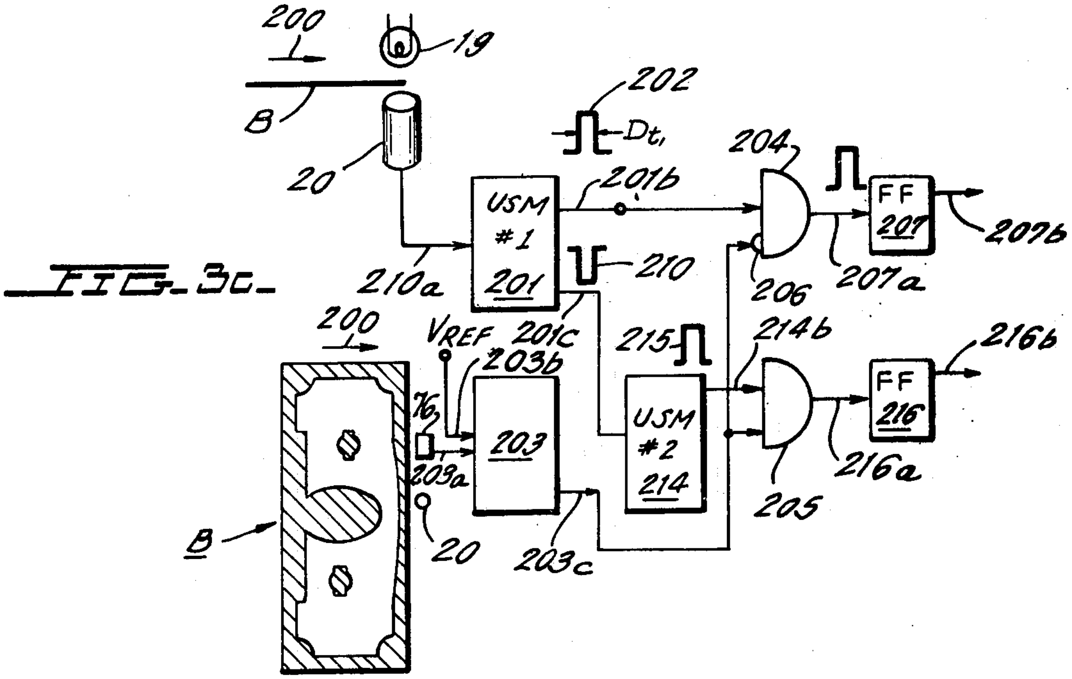
FIG. 3c
FIG. 3d
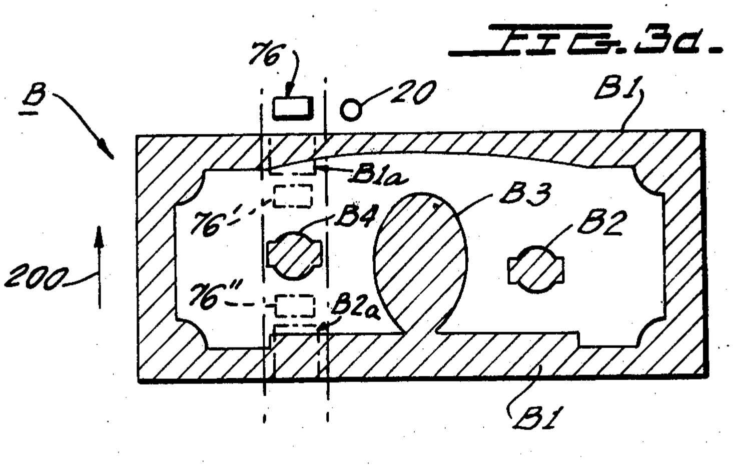

COUNTERFEIT DETECTION MEANS FOR PAPER COUNTING

BACKGROUND OF THE INVENTION

The ability to detect the presence of a counterfeit bill or suspect bill requires a high degree of expertise and is typically checked at banks or other similar institutions. To date, no equipment exists which is capable of integrating the examination process into or as part of another routine activity so as to greatly facilitate the handling of such currency, the ideal technique being the ability to perform initial tests on currency simultaneously with a normal counting or processing operation thereby significantly reducing the amount of time per individual note required for such handling when performed separately. Unfortunately, none of the apparatus and/or techniques presently available are capable of performing all of the above activities at high speed and within a single integrated apparatus. The tests which are typically performed are those involving detection for the presence of fluorescence and a test for detecting the presence of magnetic particles in the ink employed in printing the currency. Present day apparatus provides an arrangement for performing such tests either in a manner which requires a very significant amount of manual activity as part of the test or through the use of equipment which is extremely slow and which, in any case, is incapable of incorporating the above-mentioned tests in high-speed counting apparatus.

BRIEF DESCRIPTION OF THE INVENTION

The present invention is characterized by comprising a novel high-speed document handling and counting device in which the above-mentioned tests may be selectively performed either individually or simultaneously and wherein either or both tests are further performed simultaneously with the performance of the document counting and/or handling activities.

The present invention comprises a high-speed document handling and counting device in which means are provided for performing a magnetic detection test and a fluorescence detection test as the documents undergo document separation, whereupon the documents, arranged in a stack in an infeed hopper, are separated and moved in a one-at-a-time fashion at spaced intervals along a feed path toward an outfeed stacker wherein the documents are counted prior to reaching the outfeed stacker. Both detection tests are completed on or before performance of the actual counting of each document and, upon the presence of a suspect bill or note, the separation and counting operations are abruptly halted and the suspect bill is the last one to be forwarded to the stacker and is thus readily identified since it is the topmost document, to thereby facilitate identification of that bill or note which is suspect and to greatly simplify its removal from the apparatus for the purpose of a more detailed observation.

The circuitry is further adapted to permit reinitiation of the counting operations and of the detection operations immediately after removal of the suspect currency and without in any way affecting the accuracy of the count.

Monitor means are provided for assuring that the fluorescence detection apparatus is in proper operating condition and, the magnetic detection means is provided with dual heads and corresponding circuitry utilized therewith to counterbalance and prevent the presence of ambient noise from developing an erroneous indication.

The fluorescence detection means is further provided with a "currency-like" background to greatly enhance the sensitivity and hence overall capability of the fluorescence detection means. Alarm means may be provided in the form of either a single alarm device common to both detection circuits or separate detection means may be provided. Means are provided for selectively enabling the detection apparatus, dependent upon the desires of the operator.

OBJECTS OF THE INVENTION AND BRIEF DESCRIPTION OF THE FIGURES

It is therefore one object of the present invention to provide novel high-speed currency and note counting apparatus incorporating extremely sensitive detection apparatus for detecting the presence of suspect currency among the currency being counted.

Still another object of the present invention is to provide novel detection apparatus for detecting the possible presence of counterfeit currency substantially simultaneously with high-speed counting of such currency and without affecting the operating speed of the counting equipment and further providing novel means for isolating the suspect currency in the equipment to facilitate its removal in a simple straightforward manner and hence to facilitate rapid reinitiation of the counting and detection operations.

Still another object of the present invention is to provide novel counterfeit detection apparatus including self-monitoring means for assuring normal operation of the equipment during a detection operation.

Still another object of the present invention is to provide novel detection apparatus including means to compensate for spurious signals to thereby prevent currency under examination from being erroneously identified as being suspect.

The above as well as other objects of the present invention will become apparent when reading the accompanying description and drawings in which:

FIG. 1 is a simplified diagrammatic elevational view of the document counting and handling device incorporating the principles of the present invention.

FIG. 1*a* is a side elevational view of the document handler showing the physical arrangement of a portion of the power train of the apparatus of FIG. 1, and FIG. 1*b* is a diagrammatic view of the entire power train of the apparatus shown in FIGS. 1 and 1*a*.

FIG. 1*c* shows an enlarged detailed view of the detector assemblies employed in the apparatus of FIG. 1.

FIG. 1*d* is a front elevational view of a portion of the apparatus of FIG. 1 showing a portion of the magnetic detector.

FIG. 2 shows a front elevational view of the apparatus of FIG. 1.

FIGS. 3*a* and 3*b* show the circuitry employed with the detection devices of FIG. 1*c*.

FIG. 3*c* is a circuit diagram of an alternative magnetic test method which may be employed to great advantage in the apparatus of FIG. 1.

FIG. 3*d* is a plan view of a piece of currency and shows the manner in which the piece of currency is examined by the circuitry of FIG. 3*c*.

DETAILED DESCRIPTION OF THE INVENTION

Figure 1:
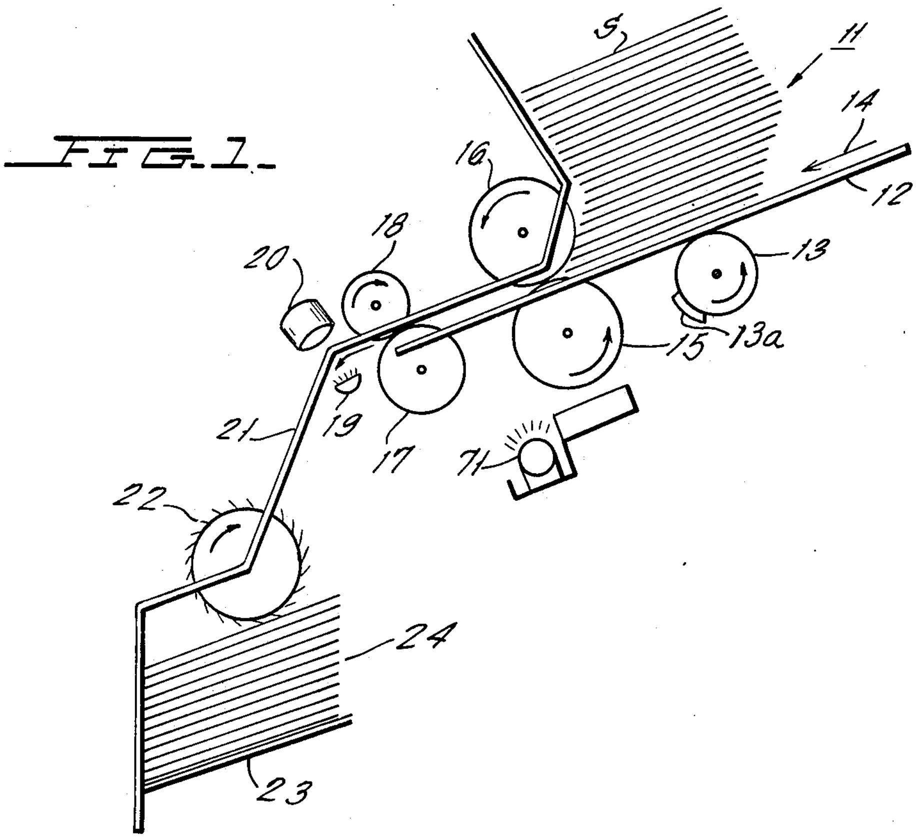
Figure 2:
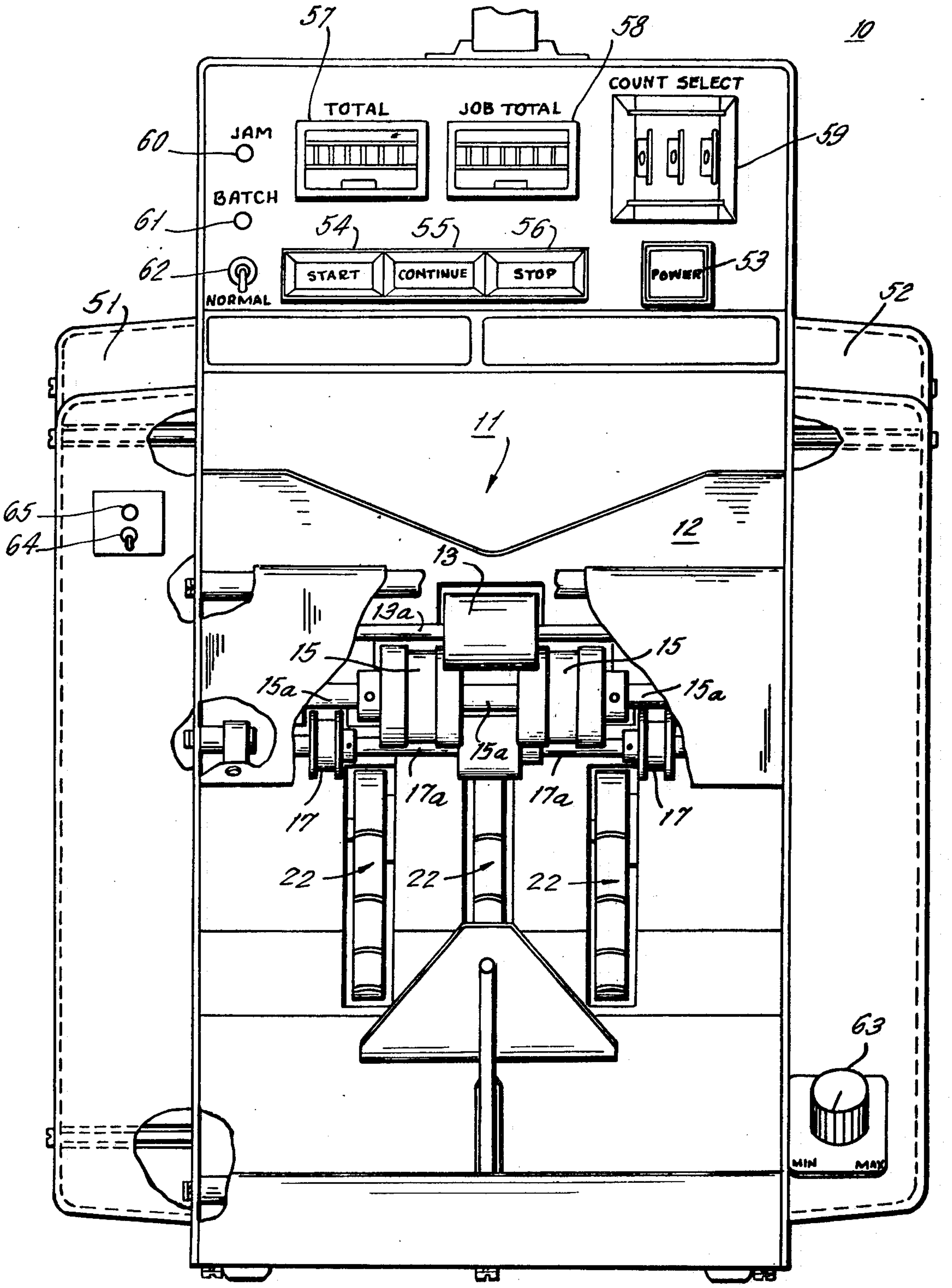

Considering FIGS. 1 and 2, the document handling and counting device 10 comprises a feed tray 11 for receiving a stack S of documents thereon so as to be bottom-fed by an eccentrically mounted surface 13*a* on picker roll 13, a portion of which protrudes through a suitable opening provided in the floor 12 of the feed tray 11. Documents are fed generally in the direction shown by arrow 14 so as to enter between feed roller assembly 15 and stripper roll assembly 16, which assemblies cooperate in such a manner as to assure that only a single document will be fed beyond the roller assemblies 15 and 16 and on a one-at-a-time basis. A detailed description of such assemblies is set forth in U.S. Pat. No. 3,771,383 assigned to the assignee of the present invention and a detailed description thereof will be omitted herein for purposes of brevity. For purposes of understanding the present invention, it is sufficient to understand that the feed and stripper roll assemblies move in opposing linear directions in the region of influence so that a forward feed drive is frictionally imparted to a document by the feed roll assembly 15 while a reverse feed drive is frictionally imparted to the same document by the stripper roll assembly 16. The relative coefficients of friction are such that the prevailing force is the forward feed drive, causing the document to be fed downstream in spite of the counteracting frictional drive forces. In cases where two or more documents are simultaneously fed between the feed and stripper assemblies, the major influence upon the lower-most document is the forward feed drive force while the prevailing influence upon the uppermost document is the reverse feed force frictionally imparted by the stripper roll assembly 16, the frictional forces between engaging double-fed documents being less than either the forward or reverse feed drive forces. Thus, the structure assures the single feeding of documents.

The single fed sheet ultimately has its downstream or forward edge enter between the acceleration roll assembly 17 and cooperating acceleration idlers 18 which abruptly accelerate the document so as to attain a linear speed greater than the linear speed of the document when moving between assemblies 15 and 16 and toward assemblies 17 and 18. The abrupt acceleration assures the provision of a gap between the trailing edge of the document now being accelerated and the leading edge of the next document to be accelerated by assemblies 17 and 18. This arrangement facilitates the counting of documents, which is provided for by means of light source 19 and document detector 20 which provides an incremental count pulse upon the occurrence of each "gap". The count pulses are accumulated in a counter 57 having a visually observable readout (see FIG. 2).

The rapid acceleration of documents through assemblies 17 and 18 assures further generally downward movement along guide plate 21 and into the carrousel stacker assemblies 22 which serve to deposit each of the documents fed thereto upon a stacker plate 23 to form a neat, orderly stack 24. The stacker carrousel assemblies 22 greatly facilitate the stacking of thin, light documents and are described in detail in U.S. Pat. No. 3,912,255. The stacker support plate 23 moves downwardly in order to accommodate the growing height of the stack.

Figure 1C:
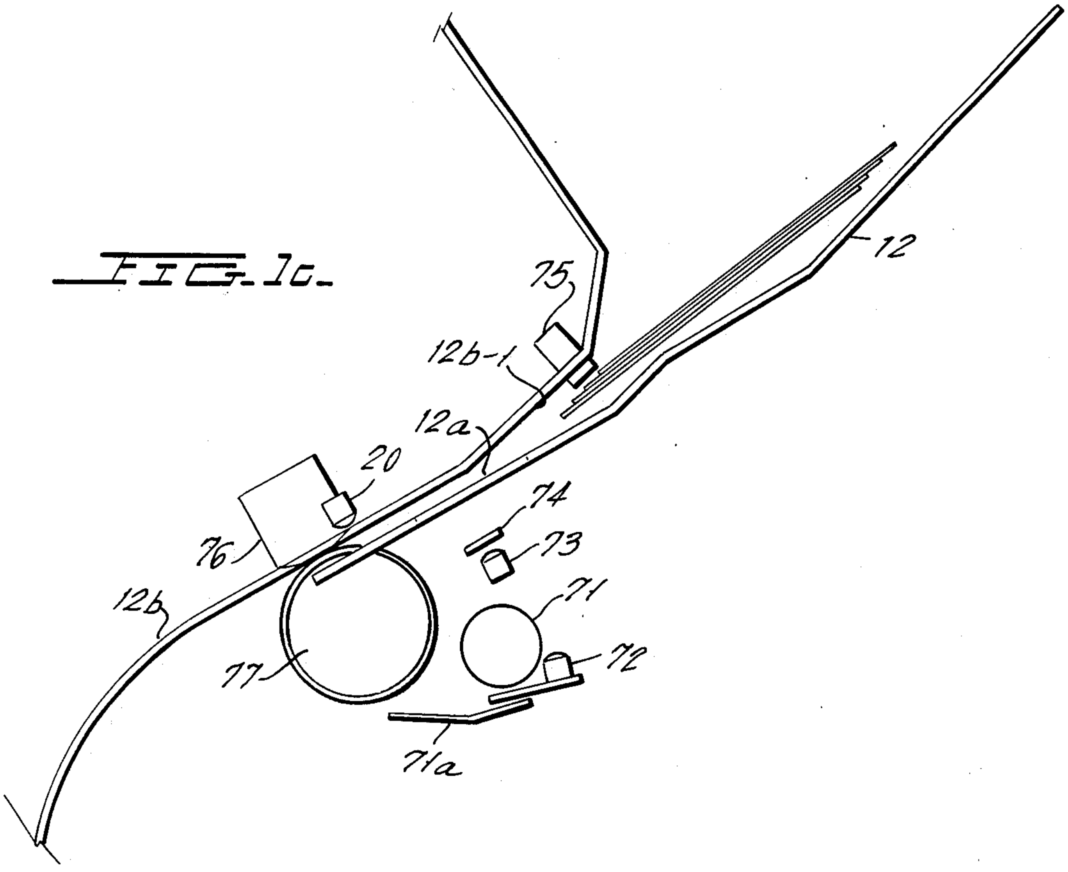
Figure 1A:
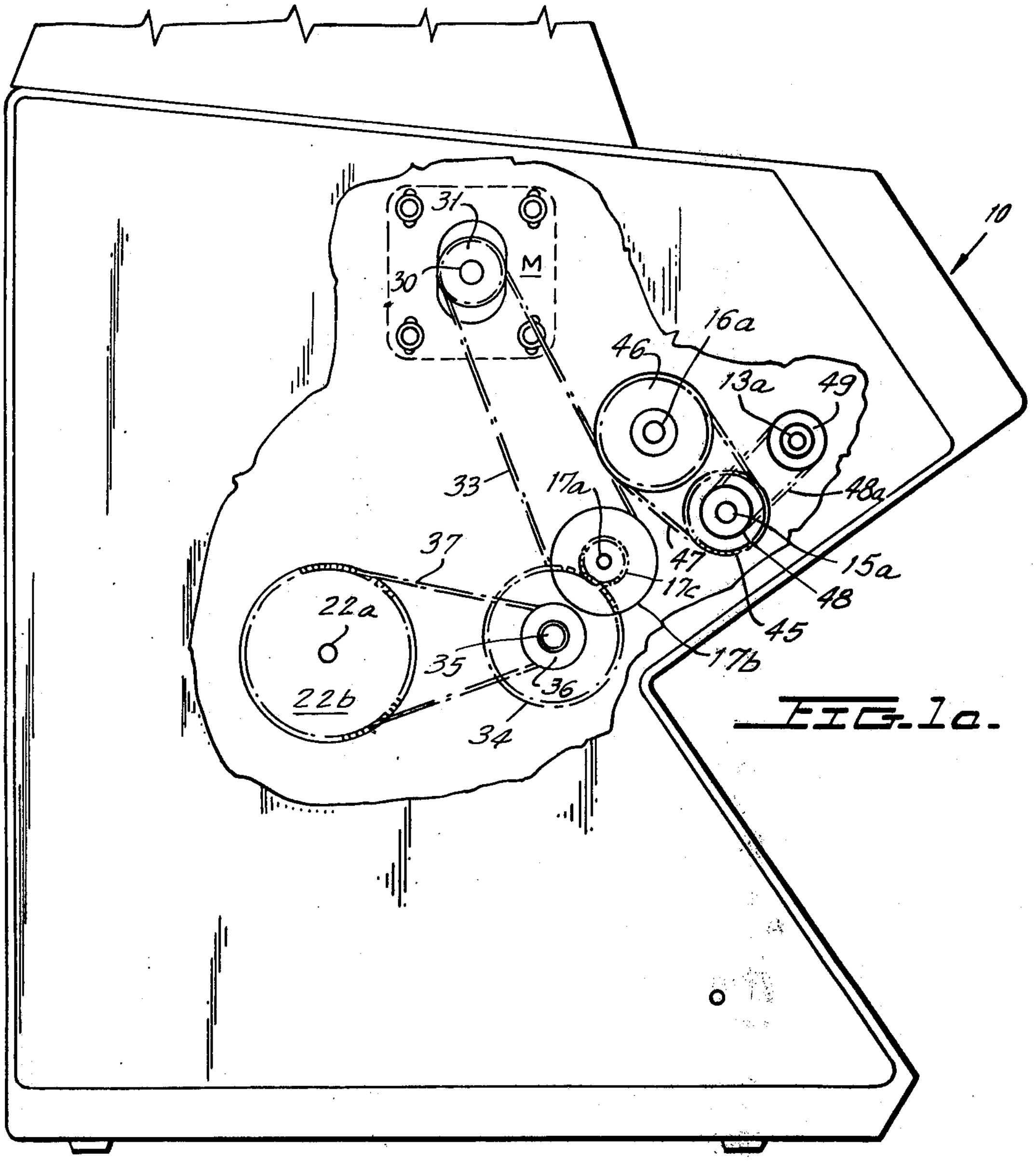
Figure 1D:
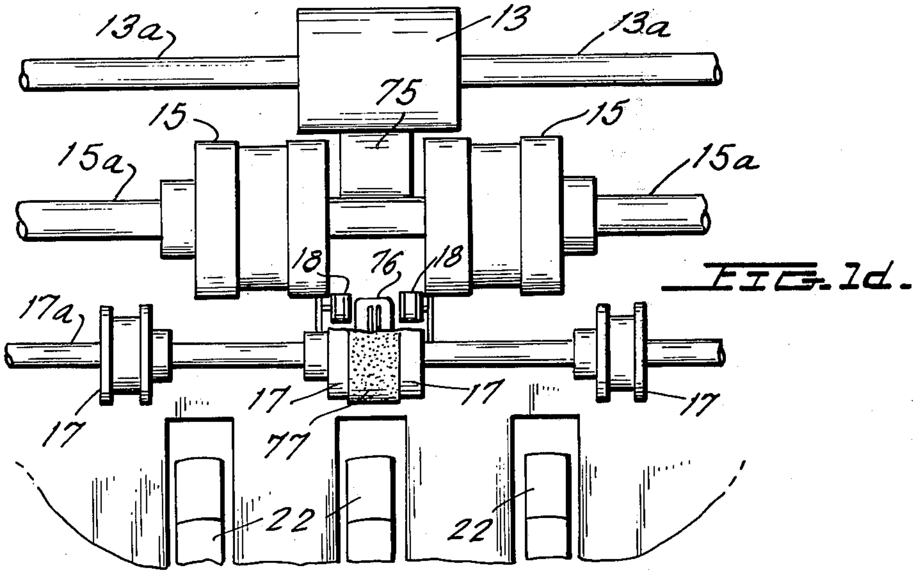
Figure 1B:
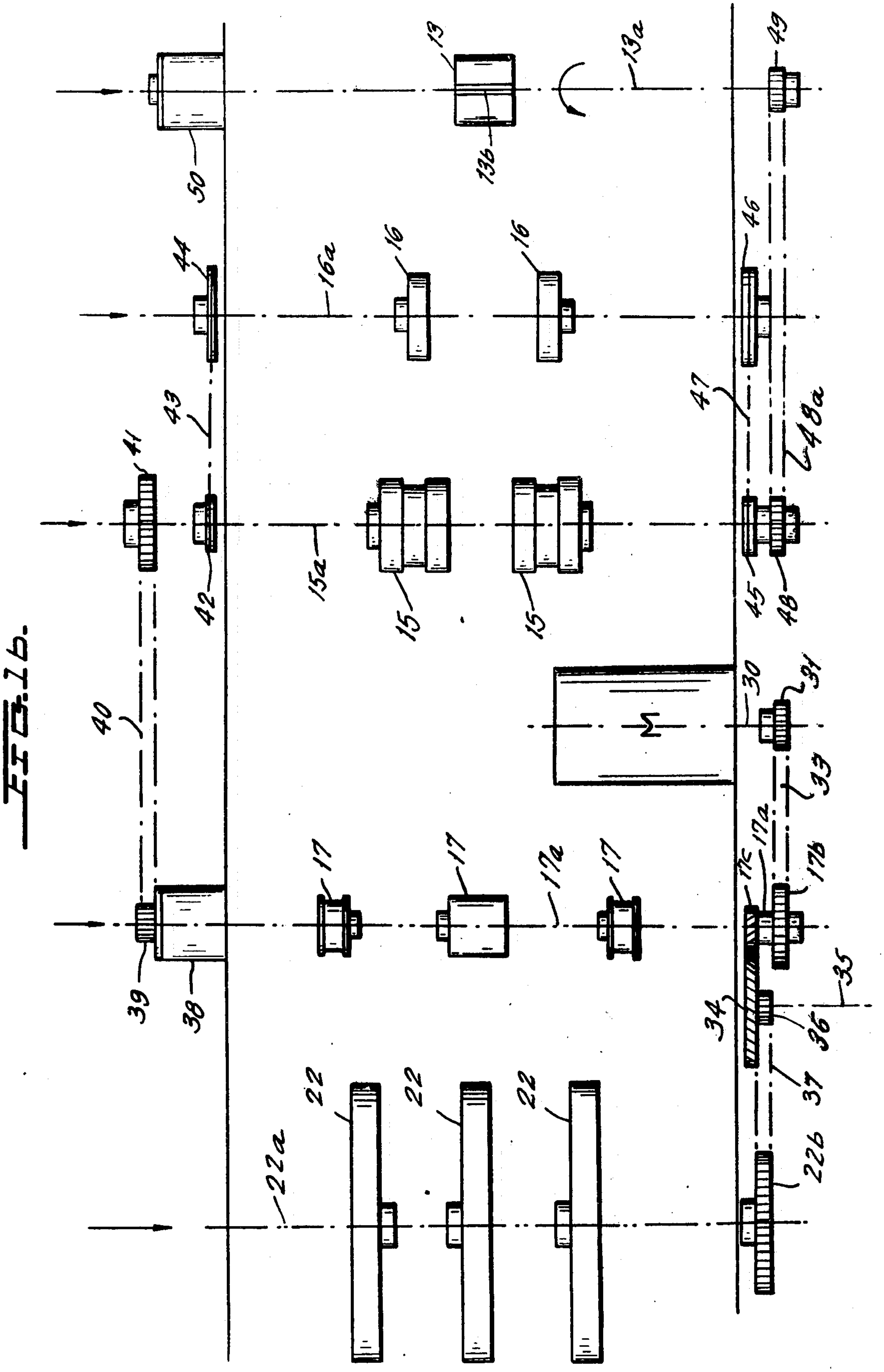

Considering the power train of the apparatus and particularly FIGS. 1*a* and 1*b*, motor M is provided with a drive pulley 31 mounted on its output shaft 30. The shaft 17*a* of acceleration roller assemblies 17 is provided with a timing pulley 17*b*. Timing belt 33 is entrained about pulleys 31 and 17*b* to impart drive to shaft 17*a* and hence to acceleration roller assemblies 17. A gear 17*c* integral with the pulley 17*b*, meshes with idler gear 34 which is mounted to rotate about shaft 35. A smaller diameter pulley 36 which is integral with gear 34 drives timing belt 37 entrained about pulley 36 and pulley 22*b* mounted upon shaft 22*a* of the stacker carrousel assembly 22.

The opposite end of shaft 17*a* is coupled to an electromagnetic clutch 38 which, when energized, couples the rotation of shaft 17*a* to timing pulley 39 mechanically coupled to the output of electromagnetic clutch 38. A timing belt 40 is entrained about pulley 39 and about a cooperating driven pulley 41 mounted upon and secured to shaft 15*a* of the feed roller assembly 15. A second pulley 42 is mounted upon and locked to shaft 15*a* and couples its drive through timing belt 43 to timing pulley 44 which is mounted upon and locked to the stripper roller assembly shaft 16*a*. The opposite ends of shafts 15*a* and 16*a* are provided with pulleys 45 and 46, respectively, which have a timing belt 47 entrained therearound. The timing belts 43 and 47 both provide the function of imparting drive from the feed roll shaft 15*a* to the stripper rollers 16 through the shaft 16*a*, as well as urging the assemblies toward one another to assure good frictional engagement between the stripper and feed rolls and the documents being processed. Both belts 43 and 47 are slightly stretched so as to urge the assemblies 15, 15 and 16, 16 toward one another to enhance the aforesaid drive and stripping operations. By placing belts on each side of the assembly, these forces are equalized.

An additional pulley 48 is mounted upon the feed roll assembly shaft 15*a* and imparts rotation to the picker roll 13 by the timing belt 48*a* entrained around pulleys 48 and 49 which latter pulley is locked to the picker roll assembly shaft 13*a*. The opposite end of shaft 13*a* is provided with an electromagnetic brake 50 which functions in a manner to be more fully described. The picker roll 13, in one preferred embodiment, is provided with an eccentrically mounted rubber-like or other similar member 13*b* exhibiting a high coefficient of friction to impart a suitable driving force to the bottom-most document in the stack S to assure feeding of the documents to the region between the drive and stripper assemblies. Briefly, the operation is as follows:

The stacker carrousel assemblies 22 and the acceleration rollers 17 rotate whenever motor M is energized, due to the direct coupling of the drive train thereto.

By selective operation of electromagnetic clutch 38 it is possible to selectively either engage or disengage the drive from motor M to the feed roller assemblies 15, stripper roller assemblies 16, and picker roll assembly 13. In addition thereto, by selective operation of electromagnetic brake 50, it is possible to abruptly halt the drive, stripper and picker roll assemblies upon disengagement of the electromagnetic clutch assembly, which operations are highly desirable for reasons to be more fully described.

FIG. 2 shows a front view of the fully assembled structure which is partially sectionalized to expose certain components shown therein. The document counting and handling apparatus 10 comprises cover plates 51 and 52 for covering the mechanical components shown in FIGS. 1*a* and 1*b*, as well as electronic circuitry (not shown for purposes of simplicity).

The in feed tray 11 is shown as being positioned below a control panel having an ON/OFF power switch 53; start, continue and stop pushbuttons 54, 55 and 56, respectively; electromagnetic TOTAL counter 57, JOB TOTAL electromagnetic counter 58; manually settable COUNT SELECT assembly 59; jam indicator light 60; batch indicator light 61 and batch selection switch 62.

Manually settable control knob 63, provided on the front surface of side cover 52, may be manually set to adjust the operating speed of the apparatus 10.

The front surface of side cover 51 is provided with sense switch 64 and suspect lamp 65 utilized in conjunction with the suspect and/or counterfeit detection operations.

FIG. 1*c* shows an enlarged and more detailed view of the detection apparatus of the present invention wherein an ultraviolet light source 71, in the form of an elongated cylindrical-shaped ultraviolet lamp (which is preferably about as long as the bills being counted), is releasably mounted beneath the lower guide plate 12 which is provided with a window or opening at 12*a* in order to enable ultraviolet light to pass through opening 12*a* and impinge upon the surface of a document passing therethrough and between guide plates 12 and 12*b*. An ultraviolet monitor 72 is provided for detecting the fact that the ultraviolet light source 71 is functioning normally, as will be more fully described. Discharge spring 71*a* serves to discharge to ground any static charge which may be developed by the pad roller 77 as will be more fully described.

A fluorescence detector element 73 is positioned beneath window 12*a* and is provided with a filter 74 which passes only blue light and eliminates all red light. The filter is adapted to pass light at 4500 angstroms and the pass band is quite narrow, the drop-off, both immediately above and immediately below 4500 angstroms, is quite abrupt and the magnitude of the drop-off is quite large thereby greatly enhancing the sensitivity of the detection device, as will be more fully described.

The magnetic detection means is comprised of a permanent magnet member 75 positioned between the feed rolls 15, as shown best in FIGS. 1*c* and 1*d*.

The magnetic sensing assembly 76 is positioned to protrude through an opening provided in upper guide plate 12*b* so as to make wiping engagement with the currency. The magnetic head is positioned immediately above an acceleration pad pressure roller 77 positioned between the left and right-hand portions of the center acceleration roller 17, which portions are engaged by the idler rollers 18, shown best in FIG. 1*d*. The pressure pad roller 77 serves to resiliently urge currency upward and against the magnetic sensing head 76 to facilitate the magnetic detection operation. When no currency is being fed the pressure pad roller serves as a head cleaning means for magnetic head 76.

The device has a capability of counting currency at the rate of the order of 1250 U.S. notes per minute wherein the counterfeit detection aid circuitry operates during counting in a fully automatic fashion.

During normal high-speed counting, each note passing through apparatus 10 is tested for certain properties of genuineness. Any note which does not satisfy all of the tests for genuineness will cause the machine to stop immediately and will light the "suspect" indicator lamp 65. At this time the suspect note will be the top-most note in the output stacker, i.e., the top-most note in stack 24, shown in FIG. 1. The suspect note may then be easily and quickly removed from the stacker for further detailed inspection while permitting substantially immediate reinitiation of the counting operation either after removal or after removal and replacement of the suspect note. Suspect notes are preferably included in the count since they are only "suspect" and may be quickly recognized by one having the requisite skill in currency handling as actually being genuine, or damaged, exceedingly worn (unfit), or in some other way defective. However, the suspect detection circuitry may be readily and simply modified to withhold the count of the "suspect" bill.

It has been found by experimentation that the quality of genuine paper currency printed by the United States Government is such that the currency, when exposed to ultraviolet light does not normally fluoresce. On the other hand, counterfeit currency has often been found to fluoresce when exposed to ultraviolet light (due to the lower quality paper used) thus providing one substantially highly reliable basis for identifying a "suspect" bill, so that, upon further detailed analysis by an expert, the bill may be properly classified as either counterfeit or genuine.

Another significant characteristic which has been found to distinguish genuine bills from counterfeit bills is the presence of magnetic particles within the ink employed in genuine bills whereas the inks usually employed in counterfeit bills incorporate no magnetic or magnetizable particles.

Figure 3B:
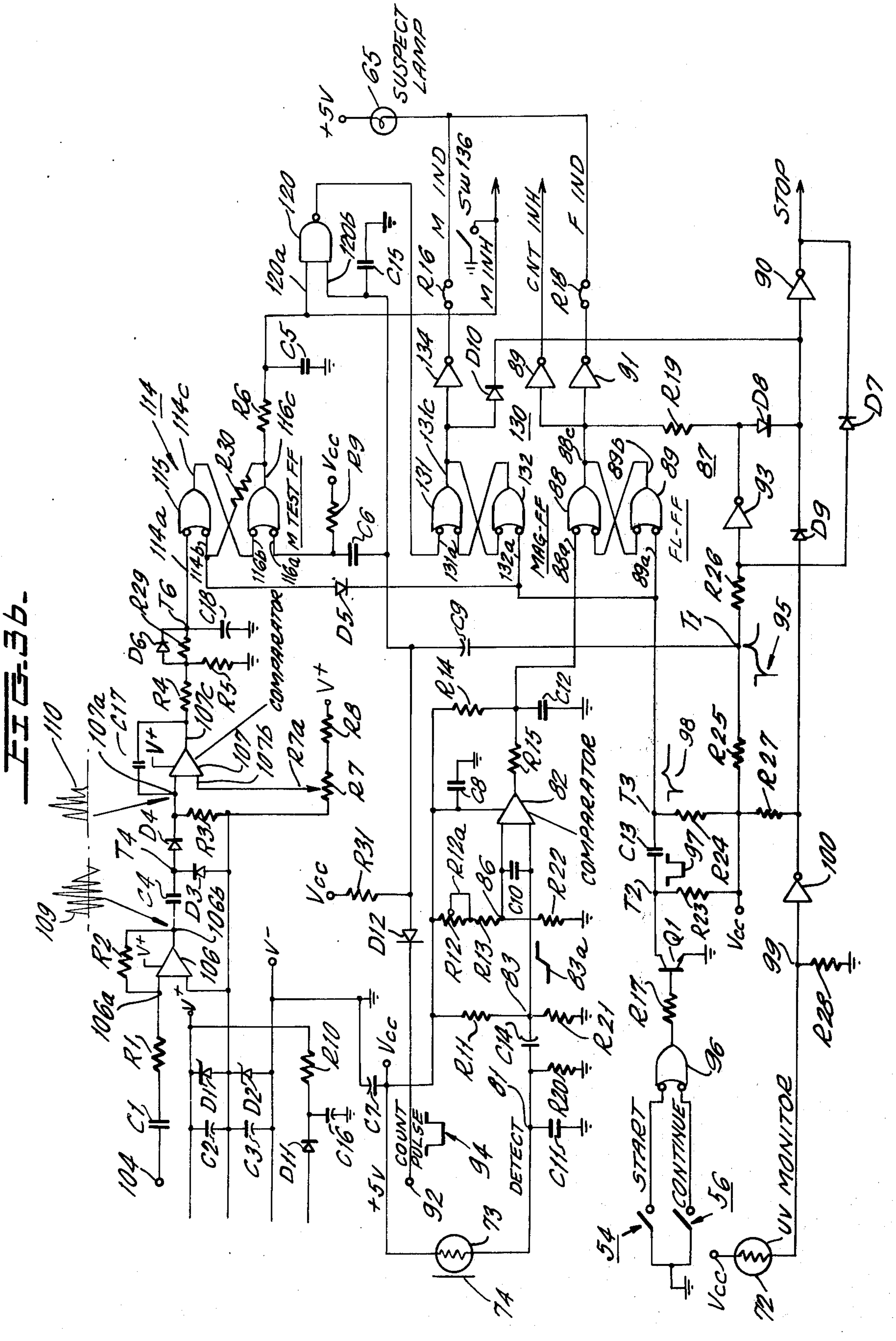

These characteristics are advantageously utilized to provide the arrangement of the present invention, whose electronic circuitry is shown in FIGS. 3*a* and 3*b*.

FLUORESCENCE DETECTION

Considering FIG. 3*b*, the fluorescent detector 73 together with filter 74, comprises a fluorescence sensitive resistance element whose resistance is of the order of 3000 to 4000 ohms in the absence of fluorescence and whose resistance drops to a value of the order of 200–300 ohms in the presence of fluorescence (i.e., when the bill fluoresces). As was mentioned above, dark blue filter 74 is positioned in front of the element 73 to pass light of the order of 4500 Angstroms, while blocking the passage to light of other wavelengths, thereby greatly increasing the sensitivity of the detector.

One terminal of element 73 is connected to a positive d.c. terminal while the opposite terminal is connected to the fluorescence detect input terminal 81. A capacitor C14 couples the level applied at 81 to the inverting input of comparator 82. The inverting input is also connected in common to terminal 83 which is also the common terminal of a potential divider circuit comprised of R11 and R21. The values of these resistors is such that the level at 83 is of the order of a fraction of a volt in the absence of fluorescent light of the appropriate wavelength.

A threshold adjustment potential divider circuit comprised of resistor elements R13, R22 and adjustable potentiometer R12 control the threshold setting at the remaining input of comparator 82 for the purpose of adjusting sensitivity of the detection circuit.

Under normal operating conditions the output of comparator 82 is high. When a fluorescence signal is detected, the inverting input increases to a value higher than the threshold level appearing at input terminal 86 causing the output of the comparator 82 to go substantially to ground potential. The threshold level is set below the pulse level produced by a slightly fluorescent document. The output of comparator 82 is coupled through resistor R15 and capacitor C12 to ground, which capacitor prevents noise spikes from damaging other components within the system and prevents such spurious signals from being erroneously identified as indicating the presence of a suspect bill.

The low level condition appearing at the output of comparator 82 in the presence of a fluorescence condition, is applied to one input **88*a* of a Fluorescense flip-flop circuit 87 which, in turn, includes the cross-coupled gates 88 and 89. When input 88*a* goes low, its output 88*c* immediately goes high to simultaneously apply a high level to the input of the count inhibit inverter 89 and to the input of the stop inverter 90 through resistor R19 and diode D8**.

Also simultaneously therewith, the high output is coupled through lamp indicator inverter 91 which goes low to substantially ground one terminal of the suspect lamp 65, whose opposite terminal is coupled to a positive d.c. supply, to illuminate the lamp. Output **88*c* although going high, is held low through R19 by the output of inverter 93, which waits for the leading edge of the document to be detected as will be set forth below. Output 88*c* is directly connected to inverter 91 which immediately turns on, i.e., goes low, to light lamp 65**.

The count pulse input terminal 92 is coupled to the count detector circuit which includes the light source 19 and phototransistor element 20 shown in FIG. 1 and further includes self-compensating circuitry as shown and described in detail in U.S. Pat. No. 3,870,868 assigned to the assignee of the present invention. A detailed description of this circuit will be omitted herein for purposes of brevity. For purposes of the present invention, it is sufficient to understand that when the forward edge of the document passes the document detector 20 and lamp source 19, light of significantly decreased intensity impinges upon the document detector 20 causing a low signal level to be applied to count pulse input terminal 92. This condition is passed through the series connected diode D12, capacitor C9 and resistor R26 to the input of inverter 93. The count pulse has a wave shape as shown at 94. The elements R25 and C9 serve to differentiate the wave shape of signal 94 thereby forming the negative and positive going impulses represented by waveform 95 at terminal $T_1$. The output of inverter 93 is normally low. However, when its output goes high, this condition allows the high level output from **88*c* to be coupled through R19 and diode D8 to the input of inverter 90 causing the output of inverter 90 to go low. This low condition is coupled through diode D7 back to the input of inverter 93 resulting in the high output at inverter 93 being maintained as a result of the feedback path. The output of inverter 90 represents the stop terminal which is coupled through suitable power amplification means to the electromagnetic clutch 38 and electromagnetic brake 50 (see FIG. 1*b*) so as to decouple the feed, stripper and picker rolls from the motor drive and simultaneously therewith abruptly halt rotation of the feed, stripper and picker rolls to prevent the feed of any further documents. Motor M, however, continues to couple drive to the acceleration rolls 17** allowing the note presently under test to be fed into the outfeed stacker. Hence, the document handler is stopped and the top note in the stack is the suspect note.

In order to reset the circuitry, either the start or continue pushbutton switches shown as 54 and 55, respectively, in FIG. 2, are depressed to couple ground potential to the respective inputs of logic gate 96. A low level at either input causes the output to go high thereby applying a high level to the base of Q1 through R17. The high level causes Q1 to conduct, dropping the level at terminal $T_2$ to ground potential. C13 and R24 differentiate the negative square pulse waveform shown at 97 to form the negative and positive going impulses shown at 98 at the output of the differentiation circuit designated as terminal $T_3$. The first negative going pulse appearing at $T_3$ is applied to input **89*a* of logic gate 89 causing its output 89*b* to go high thereby resetting the Fluorescence Detection flip-flop so that the output 88*c* is low. This low condition is inverted by inverter 91 to extinguish the suspect lamp 65** by placing a substantially zero voltage across the lamp.

The ultraviolet monitor element 72 is an element whose resisitivity characteristic is similar to that of element 73 wherein the resistance of the element changes from a few thousand ohms to a few hundred ohms when the ultraviolet lamp is illuminated and is operating normally. This places a high level at the common terminal 99 between R28 and inverter 100 causing the output of inverter 100 to go low.

In the event that the ultraviolet lamp is extinguished for any reason, the level at 99 goes low causing the output of inverter 100 to go high thereby applying a high level to the input of inverter 90 through diode D9. This immediately creates a stop signal preventing any counting from taking place until the defective state of the ultraviolet lamp source is corrected.

MAGNETIC DETECTION

Magnetic detection is accomplished by magnetizing a centrally located strip of each bill as it passes the feed wheels 15,15 by means of the permanent magnet member 75 shown best in FIG. **1*d*. This causes magnetic polarization of any magnetic or magnetizable particles in the ink. Preferably the bills are fed through the document handling apparatus 10 in face-up fashion. Magnet 75 is preferably positioned to project downwardly through an opening plate 12*b*-1** so as to pass over the oval portion of a bill containing the portrait.

As shown best in FIGS. **1*c* and 1*d*, the notes then pass between the resilient acceleration roll pad 77 and the magnetic head 76**.

The design of the magnetic head assembly 76, as shown best in FIG. **3*a*, is such that a pair of heads 76*a* and 76*b* are provided and their windings are connected in opposing polarity fashion to compensate for any spurious noise which may be created in the circuitry such as machine brush noise, a.c. noise, etc. Any such noise is picked up by both heads 76*a* and 76*b*** and is effectively nulled so as to avoid the generation of a signal which might otherwise be erroneously interpreted as the presence of a magnetic field. The very close spacing of the heads also substantially nullifies any phase difference in signals picked up by the heads.

Since the printing in the region being scanned by the head assembly is not uniform but in fact is rather randomly distributed, the signals from the two heads will not cancel and hence will yield a resultant output.

The signal undergoes two stages of amplification at 102 and 103 wherein the output of amplifier 103 is coupled to the magnetic detect input terminal 104. The signal level is then applied to input 106*a* of amplifier 106 through resistor R1 and capacitor C1. The output of amplification stage 106 is applied to one input of comparator 107 through a voltage double circuit including C4, D3, D4 and R3. Only positive going excursions are applied to the inverting input 107*a* of comparator 107, the input waveform at output 106*b* being shown at 109 and the output waveform of the voltage doubler, whose output is coupled to inverting input 107*a*, being shown by waveform 110. The operation is such that diode D3 establishes a reference level. When the level at output 106*b* increases, since the voltage across C4 cannot increase instantaneously, the level at $T_4$ increases accordingly. In the event that the level at output 106*b* drops below reference level $T_4$, diode D3 prevents the level at terminal $T_4$ from dropping below the reference level and hence serving as a voltage "doubler". The output at 107*a* is compared against an adjustable threshold established by resistor R8 and potentiometer R7 having adjustable arm R7*a* coupled to the remaining input 107*b* of comparator 107.

Output 107*c* is normally high and goes low when the level at its inverting input 107*a* exceeds the threshold input level at 107*b*. R4 and R5 form a voltage divider circuit. R29 and C18 form a "window" which is arranged to "look" at the amplitude and the time interval of the amplitiude and of the threshold of the amplitude. Since the level at 107*c* of comparator 107 is normally high, capacitor C18 is normally fully charged. The output level at 107*c* goes low in the presence of a magnetic condition whereupon C18 discharges through R29 and R5. However, the level at $T_6$ does not go low until C18 has discharged by a sufficient amount. The time interval over which this occurs is determined by the parameters of C18, R29, R5 and R4. When the output of comparator 107 returns to its normally high level, C18 is rapidly charged through D6.

Assuming that the level at terminal $T_6$ goes low, the magnetic test flip-flop, comprised of cross-coupled logic gates 115 and 116, has its output 116*c* go low when the level at input 114*a* goes sufficiently low to cause output 114*c* to go high.

From a consideration of FIG. 1*c*, it can be seen that the magnetic detection head 76 and document sensor 20 are positioned in close proximity to one another. Thus, when the magnetic head 76 is sensing the document, the count pulse is being developed at that time. As was mentioned hereinabove, the count pulse input 92 goes low when the forward edge of the document is detected and stays low for the duration of the document. This condition is passed through diode D12 and is acted upon by the differentiator circuit comprised of resistor R9 and capacitor C6 to input 116*a* of logic gate 116, causing output 116 to go high. Also input 120*b* of AND gate 120 receives the count pulse and is held low for the duration of the document.

Let it be assumed that the bill under examination is a genuine bill. Under theses circumstances the operation of the circuitry is as follows:

When the bill under examination passes detector 20 the level at output 116*c* is high, as was set forth above. This causes C5 to charge through R6. C5 is normally discharged and requires a predetermined time interval to reach a level sufficient to apply a high condition to one input of gate 120 thus serving as a means for delaying a high going level to this AND gate. The count pulse goes low and remains low during the time it takes the document to pass the detector 20. The count pulse causes the input 116*a* of magnetic test flip-flop 114 to pulse low. This low level is also applied to input 120*b* and prevents the output of AND gate 120 from going low. When the proper magnetic properties are detected, the output 107*c* of comparator 107 goes low. If the low condition persists for a sufficient interval, input 114*a* goes low causing output 114*c* to go high. A high level at 116*b* causes 116*c* to go low. Output 116*c* stays low as the low count pulse is terminated and, even as the count pulse goes high. With the count pulse high, the level at input 120*b* also goes high. However, the level at input 120*a* is low maintaining a high output at the output of gate 120. This high level is applied to the input 131*a* of magnetic flip-flop 130 comprised of cross-coupled gates 131 and 132. This results in output 131*c* remaining low, which level is inverted by inverter 134 which, in turn, has its output coupled to suspect lamp 65. Thus, when the level at 131*c* is low, the output of inverter 134 remains high preventing suspect lamp 65 from being energized. Simultaneously therewith the output 131*c* is coupled through diode D10 to inverter 90 so that when a low level condition is applied thereto the output of inverter 90 remains high to permit counting and document detection to be continued.

In the example where no magnetic signal is detected (i.e., when a "suspect" bill is being examined), a low level count pulse applied through D12 and C6 sets the magnetic test flip-flop 114 causing output 116*c* to go high. This high level is applied to input 120*a* of AND gate 120 only after a predetermined delay period. Output 116*c* stays high even after the termination of a low count pulse level whereupon the output level at 120*a* is high simultaneously with a high level at 120*b* (due to the termination of a low count pulse level). As a result, the output of AND gate 120 goes low, pulsing 131*a* low and causing the output 131*c* of magnetic flip-flop 130 to go high. This condition is inverted at 134 to energize suspect lamp 65. The high level appearing at 131*c* is also applied through D10 to the input of inverter 90 causing its output to go low whereupon a stop condition is generated.

Summarizing, in the case of a genuine bill, the magnetic condition detected by the comparator 107 is delayed by C18, R4, R5, R29 before applying a suitable low level signal to input 114*a*. However, at a time prior to the termination of a low count pulse level the magnetic test flip-flop 114 is reset causing the output 116*c* to go low thereby preventing the application of a high level at input 120*a* of AND gate 120 at the time that its input 120*b* goes high. Thus, the output of AND gate 120 remains high causing the level at output 131*c* of magnetic flip-flop 130 to be maintained low. This condition is inverted at 134 causing the suspect lamp to be extinguished.

If desired, a separate magnetic suspect lamp independent of lamp 65 may be provided so as to provide a separate indication of the result of the fluorescence and magnetic tests.

The circuitry of FIG. 3*b* is further designed so as to prevent a suspect condition on a bill which has just been examined from preconditioning the circuitry to cause the next bill to be examined upon reinitiation of counting to be otherwise erroneously indicated as a suspect bill. Considering FIG. 3*b* in more detail, a low at either the start or continue inputs to logic gate 96 results in the application of a low going pulse which is applied to the reset input 132*a* of magnetic flip-flop 130 causing the level at output 131*c* to go low. This low going reset pulse is also applied through diode D5 to the magnetic test flip-flop at its input 114*b* to reset the magnetic test flip-flop causing the level at its output 116*c* to go low.

The magnetic test may be inhibited by closing the magnetic inhibit switch 136 to maintain a low level at input 120*a* of gate 120.

The output of inverter 90 is electrically connected to the stop button 56 (see FIG. 2) which causes the clutch to disengage and causes the brake to engage while the motor keeps running in order to prevent any more bills behind the suspect bill from passing through the document handling device. The motor remains directly connected to the acceleration rolls to assure that the suspect bill will be pulled through the apparatus and be positioned as the topmost document in the output stacker 24. After the count pulse goes high again, the motor is automatically shut off. This is described in the above-mentioned U.S. Pat. No. 3,870,868, and the description of FIGS. 4*c* and 4*e*.

The diode D6, the resistor R29 and capacitor C18 are provided for noise rejection, as well as for rejecting bills having very small magnetic fields. The output 107*b* of comparator 107 must remain at a low level for a time sufficient to permit C18 to discharge.

Diode D7 functions to prevent erroneous operation of the circuitry. For example, assuming a suspect bill is the first bill in the feed tray 12 and that the start or continue pushbutton is depressed and held down for a prolonged period of time so as to otherwise "override" a stop condition due to the presence of a suspect bill as the bottommost bill in the feed tray. D7 prevents this from occurring by lengthening the stop level time interval to cause the stop condition to occur even if the continue button is either deliberately or accidentally maintained in the depressed (i.e., closed) condition. This is due to the fact that the stop level is fed back to the input of inverter 93 to maintain a low level at this point in spite of the appearance of a high level at $T_1$ (i.e., at the opposite terminal of R26).

The signal-to-noise ratio of the detection apparatus has been significantly improved by inclusion of the dark blue filter 74 mentioned hereinabove and further by providing a background upon the lower surface 12*b*-1 of guide plate 12*b* (see FIG. 1*c*) which is adapted to have a reflectivity characteristic which closely resembles that of genuine currency. This is accomplished by painting or otherwise treating the surface 12*b*-1 of guide plate 12*b* with a green paint or coating so that the output of photocell 73 changes very little at times when a document has passed window 12*a* and the next document has yet to enter window 12*a* so that the ultraviolet light is reflected from the surface 12*b*-1. In the absence of this background, the surface of plate 12*b*, which is typically formed of metal, yields a significantly increased output level. As the currency passes window 12*a* the reflected utraviolet light is significantly reduced as compared with that reflected from an unpainted surface thereby causing the resistivity characteristic of detector 73 to change significantly during operation of the apparatus. By providing a background on surface 12*b*-1 which yields an output picked up by detector 73, which output substantially resembles that emitted by genuine currency, this output is significantly reduced compared to an untreated metal surface thereby enabling a more sensitive adjustment to be made in the fluorescence detection circuitry. Some paints have been found to have a very slight fluorescing characteristic which nevertheless is quite low as compared to counterfeit or suspect currency thereby enabling adjustment of the fluorescent detect circuitry (through adjustment of potentiometer arm R12*a* of potentiometer R12 as shown in FIG. 3*b*) enabling sensitivity of the circuitry to be greatly enhanced. If desired an actual bill or a replica may be painted on, affixed to or otherwise provided an the surface of plate 12*b*.

Another detection scheme which may be employed with the apparatus of the present invention takes advantage of a unique aspect of paper currency presently utilized in the United States. For example, FIG. 3*d* shows in simplified fashion the face of a typical United States bill B in which the cross-hatched regions B1, B2 and B3 are all printed with ink containing magnetic particles. However, the "seal" located in the region B4, designated simply by a circle, is printed with ink containing no magnetic or magnetizable particles whatsoever. Using this information to great advantage, the scheme for detecting the presence of suspect currency may be carried out by means of the circuitry shown in FIG. 3*c*. Considering FIGS. 3*c* and 3*d*, let it be assumed that the bill B is moving in the direction shown by arrow 200. As soon as the forward edge of the bill B begins to pass between light source 19 and detector 20, the output pulse from detector 20 is coupled to the trigger input 201*a* of one-shot multivibrator 201, causing output 201*b* to develop the trigger pulse 202. The pulse duration $D_{t1}$ of pulse 202 is such that the leading edge begins at about the time that the first portion of printing in the region $B_{1a}$ passes beneath magnetic head 75 and the pulse 202 terminates at about the time that magnetic head 75 occupies the position 76' relative to the bill B (see FIG. 3*d*). The magnetic head assembly couples its output to one input of comparator 203 which compares the level of the magnetic signal against a reference level applied to input 203*b*. Although not shown for purposes of simplicity, it should be understood that the amplification stages as shown in FIGS. 3*a* and 3*b* may also be employed before undergoing the comparator operation.

If magnetized particles are detected, the output 203*c* of comparator 203 goes high. This condition is simultaneously applied to respective inputs of AND gates 204 and 205. Assuming the positive going pulse 202 to be present at this time and assuming the presence of a genuine bill, the high level at output terminal 203*c* of comparator 203 will be inverted by inverter 206 causing this output to go low and hence preventing gate 204 from developing an output pulse.

Presuming the absence of magnetized ink particles during the time that pulse 202 is present, the level at output 203*c* will be low. This condition will be inverted at 206 causing two high conditions to set the output of gate 204 high. This condition triggers bistable flip-flop 207 at its input 207*a* causing an output to be provided at 207*b*. This output may be coupled to suspect lamp 65 as was previously described.

The output 201*c* of one-shot multivibrator 201 develops the negative going pulse 210 simultaneously with the development of the positive going pulse 202. Thus, the trailing edge of pulse 210 goes high at the same time that the trailing edge of pulse 202 goes low. This high going pulse is utilized to trigger one-shot multivibrator 214 at its input 214*a* causing its output 214*b* to develop the positive going pulse 215. The leading edge of pulse 215 occurs just prior to the time that the region B4 containing the seal on bill B begins to move over magnetic head 75. The duration of pulse 215 is such as to terminate after the magnetic head has passed over the region before of the seal and before reaching the lower border region $B_{1b}$ so that the pulse 215 terminates when the head is about in the position shown by the dotted rectangle 76" (relative to bill B). During this time interval the magnetic head 75 continues to scan for the presence of magnetized particles. Assuming that the bill is genuine, no magnetized particles will be present. As a result, the level at output terminal 203*c* of comparator 203 will be low preventing the occurrence of an output pulse at the output of AND gate 205. In the event that a magnetic field is detected during the presence of pulse 215, the output level at terminal 203*c* of comparator 203 will be high. This will cause a high level to be developed at the output of gate 205 triggering bistable flip-flop 216 at 216*a* so as to cause its output 216*b* to go high, which condition may be utilized to illuminate the suspect lamp.

As an alternative to the use of first and second delay means as shown in FIG. 3*c*, the second multivibrator 214 may be eliminated and a second magnetic head assembly may be provided. As shown in FIG. 3*d*, the second head assembly may be placed at position 76'. The head assemblies 76 and 76' are respectively connected to inputs of gates 204 and 205, independently of one another avoiding the need for one-shot 214 and also allowing the detection operations to be performed simultaneously rather than sequentially.

What is claimed is:

1. Apparatus for handling documents such as bills and currency at high speed and for simultaneously examining the currency to determine whether the currency is genuine or is suspect comprising:

a feed tray for receiving a stack of documents to be counted and tested;

first means cooperating with the feed tray for advancing each document from the feed tray in a one-at-a-time fashion from the stack thereby advancing the documents in a forward feed direction said first means operating continuously during a normal document handling operation;

second means for receiving documents delivered from said first means to provide a gap of predetermined minimum length between adjacent edges of successive documents, said gap length being measured in the feed direction;

third means responsive to the forward edge of each bill for generating a count signal, said signal having an interval equal to the time required for the bill to pass said third means;

means for stacking the bills delivered thereto by said second means;

a light source for illuminating bills as they pass the light source;

fluorescence detection means for examining said documents as they pass through said first means and adapted to generate a suspect signal when the bill being examined fluoresces under the influence of the light source;

feed control means responsive to said suspect signal and to said count signal for abruptly halting said first means once the fluorescing bill is engaged by said second means to prevent further counting and testing of documents which may yet be in the feed tray and to assure that the suspect bill will be the last bill fed to the stacking means to thereby facilitate simple, rapid removal of the suspect bill for further examination.

2. Apparatus for counting currency and for simultaneously testing the genuineness of the currency simultaneously with the counting operation comprising:

first means for receiving a stack of currency to be counted and tested;

an outfeed stacker means;

second means for continuously advancing the currency one bill at a time and at high speed from said stack towards said stacker said second means operating continuously during a normal document handling operation;

means for counting said currency as they move towards said stacker means;

a source of ultraviolet light positioned to illuminate the currency moving towards said stacker means;

first detector means positioned to receive only that light reflected from the currency;

said first detector means including filter means for permitting only that light of a predetermined wavelength determined by said filter means to activate said first detector means;

said filter means being a dark blue filter.

3. The apparatus of claim 2 wherein said filter is adapted to pass light of a wavelength of 4500 Angstroms.

4. The apparatus of claim 3 wherein said light source emits light in the near-ultraviolet range from 2000 to 4000 Angstroms.

5. The apparatus of claim 2 further comprising alarm means responsive to said suspect signal for providing an alarm to indicate the presence of a suspect bill;

control means responsive to said suspect signal for halting the counting operation to prevent bills following the bill identified as suspect from reaching said stacker means.

6. The apparatus of claim 5 further comprising manually operable means for resetting said alarm means and said control means.

7. The apparatus of claim 1 further comprising monitor means responsive to an insufficient output level from said light source for preventing operation of said first means and hence prevent the handling and/or examination of currency.

8. The apparatus of claim 1 further comprising means for magnetizing a portion of each bill as it passes through said first means;

sensing means for sensing the presence of a magnetic field created by particles on said bill magnetized by said magnetizing means to generate an output signal whose magnitude represents the strength of the detected field;

second sensing means positioned adjacent to said sensing means for generating a signal as the forward edge of a bill passes said second sensing means;

first delay means responsive to the output signal of said second sensing means for generating an enable signal of a predetermind time interval;

second delay means responsive to termination of the first delay means enable signal for generating a second enable signal of a predetermined time interval;

first and second logical gate means respectively coupled to said first and second delay means being connected in common to said first sensing means for generating an output representative of the magnetic field strength picked up from adjacent first and second portions of the bill passing beneath said first sensing means whereby said logical gate means serve to differentiate between the portions of the bill being examined to thereby differentiate between the contrasting outputs derived therefrom due to the known differences encountered in genuine bills.

9. The apparatus of claim 1 further comprising:

means for magnetizing a portion of each bill as it passes through said first means;

first and second sensing means for sensing the presence of a magnetic field created by particles on said bill magnetized by said magnetizing means for generating an output signal representative of the field strength of the detected magnetic field;

said first and second sensing means being arranged in spaced staggered fashion in the direction of movement of currency;

third sensing means positioned adjacent to said first sensing means for generating a signal as the forward edge of a bill passes said second sensing means;

first delay means responsive to the output signal of said third sensing means for generating an enable signal of a predetermined time interval;

first and second logical gating means being coupled in common to said delay means and being respectively coupled to said first and second sensing means for providing output signals representative of the magnetic field strength of staggered portions on the bill being examined, only during the presence of said enable signal to differentiate between the portions of the bill being examined to thereby differentiate between the contrasting outputs derived therefrom due to the known differences encounted in genuine bills.

10. The apparatus of claim 1 further comprising means for detecting the presence of unfiltered light from said source for generating a halt signal in the absence of such light;

means for deenergizing said feed control means responsive to said halt signal.

11. The apparatus of claim 1 further comprising manually operable reset means for disabling said feed control means to resume currency feeding;

means responsive to a halt control signal to override a reset operation by said manual reset means to prevent the continuation of the feeding operation in the event that the manual reset means is maintained in the operated condition during a time interval which overlaps a time interval during which a suspect bill is detected.

12. Apparatus for handling bills and currency at high speed and for simultaneously examining the currency to determine whether the currency is genuine or is suspect comprising:

a feed tray for receiving a stack of documents to be counted and tested;

first means cooperating with the feed tray for advancing each document from the feed tray in a one-at-a-time fashion from the stack for advancing the documents in a forward feed direction;

second means for receiving documents delivered from said first means to provide a gap of a predetermined minimum length adjacent edges of successive documents, said gap being measured in the feed direction;

third means responsive to the forward edge of each bill for generating a signal, said signal having an interval equal to the time required for the bill to pass said third means;

means for stacking the bills delivered thereto by said second means;

fluorescence detection means for examining said documents as they pass through said first means and adapted to generate a suspect signal when the bill being examined fluoresces;

means responsive to said suspect signal for abruptly halting said first means once the fluorescing bill is delivered to said second means to prevent further counting and testing of documents which may yet be in the feed tray to assure that the suspect bill will be the last bill fed to the stacking means to thereby facilitate simple, rapid removal of the suspect bill for further examination;

said sensing means comprising first and second magnetic heads each having an output winding;

means for electrically coupling said windings in opposing polarity fashion so that their outputs tend to cancel one another to thereby prevent spurious magnetic fields, which do not originate from magnetized particles in the bill from affecting the detection of the fields being measured.

13. Apparatus for counting currency and for simultaneously testing the genuineness of the currency simultaneously with the counting operation comprising:

means for receiving a stack of currency to be counted and tested;

an outfeed stacker means;

means for advancing the currency one bill at a time from said stack towards said stacker and operating continuously during normal counting operations;

means for counting said bills as they move towards said stacker means;

a source of ultraviolet light positioned to illuminate the currency passing through said first means and moving towards said stacker means;

first detector means positioned to receive only that light flouresced from the currency;

said first detector means including filter means for permitting only that light of a predetermined wavelength determined by said filter means to activate said first detector means;

a guide plate positioned along one side of the feed path of said bills as they move through said advancing means, said guide plate being positioned so that said bills move between said light source and one surface of said guide plate;

at least a portion of said surface illuminated by said light source being covered with a color substantially similar to the bills being examined so that the characteristic fluorescence level of said covered surface is substantially similar to the characteristic fluorescence level of genuine currency to thereby greatly enhance the sensitivity of said detection means.

14. The apparatus of claim 13 wherein said surface portion is provided with a pattern which substantially simulates the reflectivity of the currency being counted to said light source.

15. The apparatus of claim 14 wherein said pattern is a replica of the currency being counted.

16. Apparatus for detecting suspect bills among a stack of currency comprising:

first means operating in a continuous fashion during a normal document handling operation for advancing bills from said stack in a feed direction in a one-at-a-time fashion;

stacker means;

acceleration means for receiving bills delivered from said first means for accelerating bills and directing said bills to said stacker means;

means for magnetizing a portion of each bill as it passes through said first means;

sensing means for sensing the presence of a magnetic field created by particles on said bill magnetized by said magnetizing means for generating a suspect signal when the position of the bill passing said magnetizing contains no magnetized particles;

means positioned adjacent to said sensing means for sensing the presence of a bill;

means responsive to said bill sensing means and said magnetic field sensing means for abruptly disabling said first means to halt feeding of currency when said sensing means fails to sense the presence of magnetizable particles in the bill being examined and when the bill being examined has passed beyond the influence of said first means.

17. The apparatus of claim 16 comprising rotating means positioned to wipingly engage said sensing means for urging each document against said sensing means when a document passes between said rotating means and said sensing means and for cleaning the surface of said sensing means engaged by said rotating brush means at times when no document passes there between.

18. Apparatus for detecting suspect bills among a stack of currency comprising:

first means operating continuously during a normal document handling operation for advancing bills from said stack in a feed direction in a one-at-a-time fashion;

stacker means;

acceleration means receiving bills delivered in said first means for accelerating bills and directing said bills to said stacker means;

means for magnetizing a portion of each bill as it passes through said first means;

sensing means for sensing the presence of a magnetic field created by particles on said bill by said magnetizing means for generating a suspect signal when the position of the bill passing said magnetizing contains no magnetized particles;

said sensing means comprising first and second closely spaced magnetic heads each having an output winding;

means for electrically coupling said windings in opposing polarity fashion so that their outputs tend to cancel one another to thereby prevent spurious magnetic fields, which do not originate from magnetized particles in the bill from affecting the detection of the fields being measured.

19. The apparatus of claim 18 further comprising means for providing a reference level;

comparator means for comparing the output signal from said sensing means with said reference level to generate a suspect signal when the said output signal is less than said reference level.

20. The apparatus of claim 19 wherein said reference level means includes means for adjusting said reference level.

21. Apparatus for detecting suspect bills among a stack of currency comprising:

first means operating continuously during a normal document handling operation for advancing bills from said stack in a feed direction in a one-at-a-time fashion;

stacker means;

acceleration means receiving bills delivered from said accelerating bills and directions said bills to said stacker means;

means for magnetizing a portion of each bill as it passes through said first means;

sensing means for sensing the presence of a magnetic field created by particles on said bill magnetized by said magnetizing means to generate an output signal whose magnitude represents the strength of the detected field;

second sensing means positioned adjacent to said sensing means for generating a signal as the forward edge of a bill passes said second sensing means;

first delay means responsive to the output signal of said second sensing means for generating an enable signal of a predetermined time interval;

second delay means responsive to termination of the first delay means enable signal for generating a second enable signal of a predetermined time interval;

first and second logical gate means respectively coupled to said first and second delay means being connected in common to said first sensing means for generating an output representative of the magnetic field strength picked up from adjacent first and second portions of the bill passing beneath said first sensing means whereby said logical gate means serve to differentiate between the portions of the bill being examined to thereby differentiate between the contrasting outputs derived therefrom due to the known differences encountered in genuine bills.

22. Apparatus for detecting suspect bills among a stack of currency comprising:

first means operating continuously during a normal document handling operation for advancing bills from said stack in a feed direction in a one-at-a-time fashion;

stacker means;

acceleration means receiving bills delivered from said first means for accelerating bills and directing said bills to said stacker means;

means for magnetizing a portion of each bill as it passes through said first means;

first and second sensing means for sensing the presence of a magnetic field created by particles on said bill magnetized by said magnetizing means for generating an output signal representative of the field strength of the detected magnetic field;

said first and second sensing means being arranged in spaced staggered fashion in the direction of movement of currency;

third sensing means positioned adjacent to said first sensing means for generating a signal as the forward edge of a bill passes said second sensing means;

first delay means responsive to the output signal of said third sensing means for generating an enable signal of a predetermined time interval;

first and second logical gating means being coupled in common to said delay means and being respectively coupled to said first and second sensing means for providing output signals representative of the magnetic field strength of staggered portions on the bill being examined, only during the presence of said enable signal to differentiate between the portions of the bill being examined to thereby differentiate between the contrasting outputs derived therefrom due to the known differences encountered in genuine bills.

23. Apparatus for handling bills and currency at high speed and for simultaneously examining the currency to determine whether the currency is genuine or is suspect comprising:

a feed tray for receiving a stack of documents to be counted and tested;

first means operating continuously during normal document handling operation cooperating with the feed tray for advancing each document from the feed tray in a one-at-a-time fashion from the stack for advancing the documents in a forward feed direction;

second means for receiving documents delivered from said first means to provide a gap of a predetermined minimunm length between adjacent edges of successive documents, said gap being measured in the feed direction;

third means responsive to the forward edge of each bill for generating a signal, said signal having a time interval equal to the time required for the bill to pass said third means;

means for stacking the bills delivered thereto by said second means;

fluorescence detection means for examining said documents as they pass through said first means and adapted to generate a suspect signal when the bill being examined fluoresces;

means responsive to said suspect signal for abruptly halting said first means once the fluorescing bill is delivered to said second means to prevent further counting and testing of documents which may yet be in the feed tray to assure that the suspect bill will be the last bill fed to the stacking means to thereby facilitate simple, rapid removal of the suspect bill for further examination;

means for magnetizing a portion of each bill as it passes through said first means;

sensing means for sensing the presence of a magnetic field created by magnetized particles on said bill for generating a suspect signal when the position of the bill passing said magnetizing contains no magnetized particles;

means positioned adjacent to said sensing means for sensing the presence of a bill;

means responsive to said bill sensing means and said magnetic field sensing means for abruptly disabling said first means to halt feeding of currency when said sensing means fails to sense the presence of a magnetizable particle in the bill being examined and when the bill being examined has passed beyond the influence of said first means.

* * * * *

UNITED STATES PATENT AND TRADEMARK OFFICE
CERTIFICATE OF CORRECTION

PATENT NO. : 4,114,804
DATED : September 19, 1978
INVENTOR(S) : Alan P. Jones and William Sherman It is certified that error appears in the above—identified patent and that said Letters Patent is hereby corrected as shown below:

Column 17, line 14, change "position" to --portion--.

Column 17, line 15, after "magnetizing" insert --means--.

Column 17, line 49, after "magnetizing" insert --means--.

Column 20, line 21, change "position" to --portion--.

Column 20, line 22, after "magnetizing" insert --means--.

Column 17, line 49, change "position" to --portion--.

Signed and Sealed this

*Third* Day of *May 1983*

[SEAL]

*Attest:*

GERALD J. MOSSINGHOFF

*Attesting Officer* *Commissioner of Patents and Trademarks*